Nov. 24, 1936.  A. P. WARNER  2,061,787
MAGNETIC CLUTCH
Filed Nov. 15, 1933  2 Sheets-Sheet 1
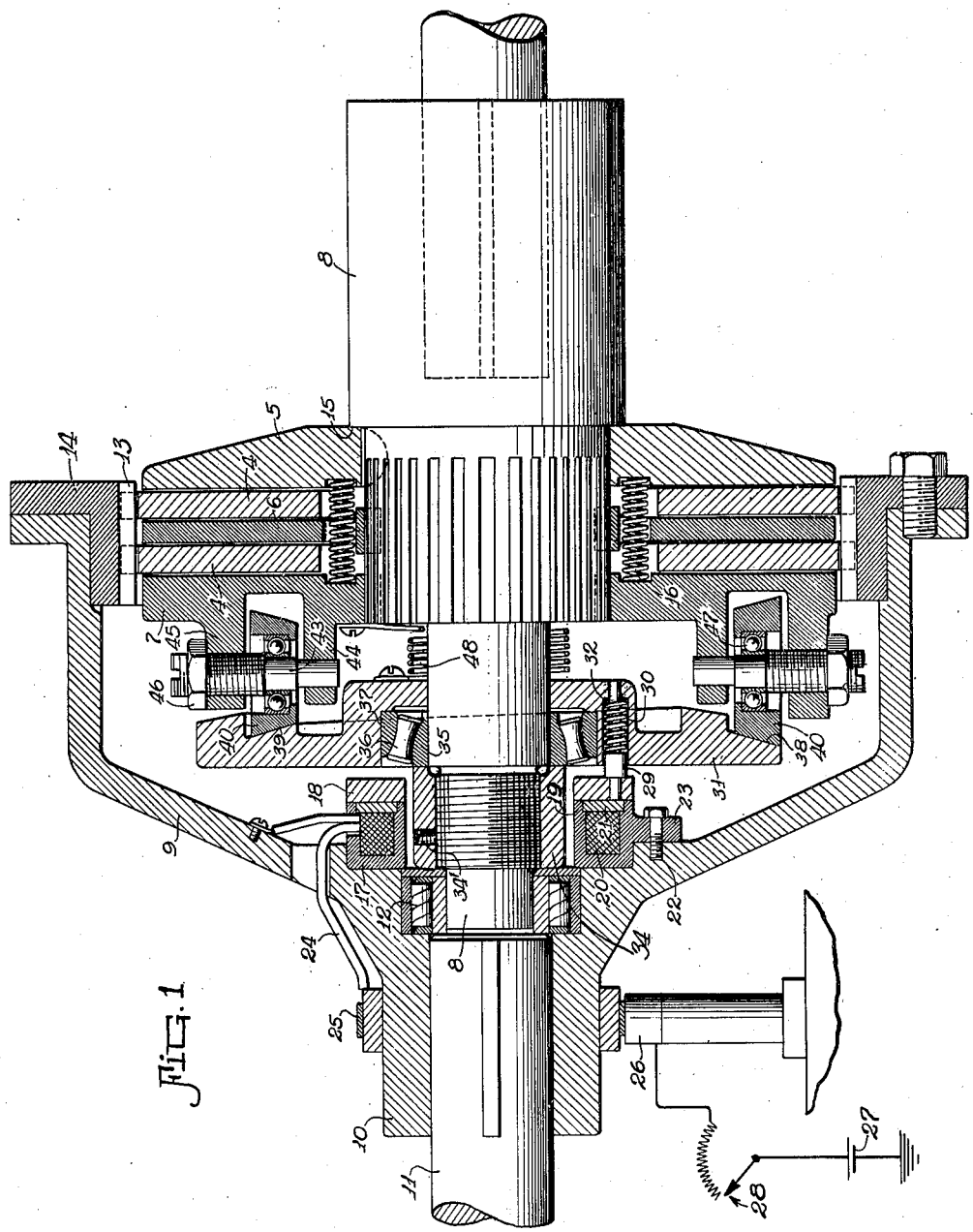
INVENTOR
Arthur P. Warner
By Chindahl, Parker & Carlson
ATTORNEYS Nov. 24, 1936.  A. P. WARNER  2,061,787
MAGNETIC CLUTCH
Filed Nov. 15, 1933  2 Sheets-Sheet 2
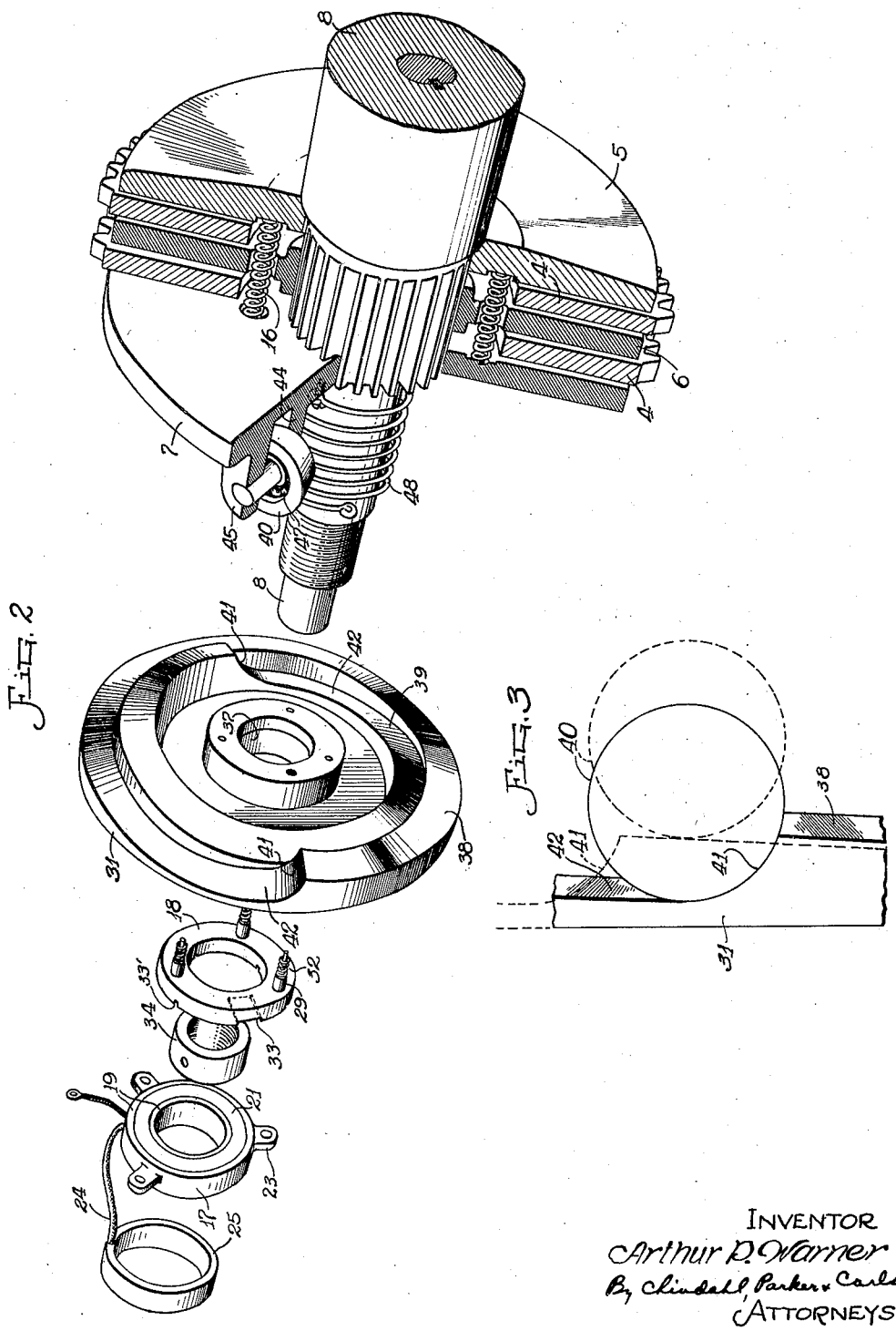
INVENTOR
Arthur P. Warner
By Chindahl, Parker & Carlson
ATTORNEYS Patented Nov. 24, 1936

2,061,787

UNITED STATES PATENT OFFICE 2,061,787

MAGNETIC CLUTCH

Arthur P. Warner, Beloit, Wis.

Application November 15, 1933, Serial No. 698,129

18 Claims. (Cl. 192—40)

This invention relates generally to friction clutches and more particularly to those of the type in which an actuating force derived by an electromagnetically controlled pilot or auxiliary clutch is augmented mechanically and utilized to produce frictional gripping engagement between the elements of a main or driving clutch.

The general object of the invention is to provide a new and improved clutch of the above character which is simple and inexpensive in construction, which is powerful and reliable in operation, which is accurately controllable both in its application and release by regulating the current energizing the magnetic pilot clutch, and which compensates automatically for a substantial amount of wear of the main clutch elements.

The invention also resides in the novel construction of the mechanism for applying the actuating force derived by a magnetic pilot clutch to the elements of a main friction clutch whereby the latter may be released reliably by spring action upon deenergization of the pilot clutch.

Another object is to provide for actuation of a main clutch from a pilot magnetic clutch by a novel motion-transmitting mechanism arranged to act at powerful mechanical advantage and at the same time to take up a large amount of wear at the main clutch surface.

Other objects and advantages of the invention will become apparent from the following detailed description taken in connection with the accompanying drawings, in which Figure 1 is a central cross-sectional view of a clutch embodying the features of the present invention.

Fig. 2 is a perspective view showing the parts of the clutch in disassembled relation.

Fig. 3 is a fragmentary diagrammatic view of a part of the force augmenting mechanism.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown, the invention is embodied in a socalled disk clutch wherein the frictional force for transmitting rotary power is derived by pressing into axial engagement a plurality of coaxially arranged plates or disks 4, 5, 6 and 7 composed of suitable friction material and carried by rotary driving and driven members of the clutch. In the present instance, these members comprise a shaft 8 and a casing 9 having a hub 10 at one end secured to a shaft 11 and open at the other end so as to receive a substantial length of the shaft 8. Proper alignment of the shafts 8 and 11 may be maintained by anti-friction bearings 12 encircling the reduced end of the shaft 8.

Herein two disks 4 are employed and, as is common in clutches of the present type, these are formed with external teeth received in correspondingly shaped grooves 13 in a ring 14 secured to the open end of the casing 9. The disks 6 and 7 are similarly splined on the shaft 8 for floating axial movement while the disk 5 is keyed to the shaft in abutment with a shoulder 15. Preferably the disks 5 and 7 are of rigid metal construction so that pressure applied to the disk 7 in the direction of the disk 5 will be distributed evenly to the intermediate disks of the clutch. Springs 16 acting between the terminal disks 5 and 7 serve to maintain the disks separated when actuating force is relieved.

The friction pilot clutch by which a circumferentially directed actuating force for applying the main clutch is derived is housed within the casing 9 and spaced axially from the main clutch so that the latter may be made of maximum radial width and the parts of the motion-transmitting connection later to be described may be located and mounted properly. In the present instance, the pilot clutch comprises a pair of annular magnetic rings 17 and 18 carried respectively by the shafts 11 and 8 and arranged to be brought into firm axial gripping engagement upon energization of an electromagnetic winding. Herein the ring 17 which constitutes the magnet is of U-shaped cross-section providing two axially facing concentric poles 19 between which the winding 20 is disposed together with suitable friction material 21 providing a wear-resisting surface substantially flush with the pole faces. The magnet may be secured to the end of the hub 10 in any suitable manner as by screws 22 threading into the hub through lugs 23 on the magnet. One terminal of the magnet winding may be grounded to the casing 9 while the other terminal is connected by the conductor 24 to an insulated ring 25 continuously engaged by a brush 26 which is connected to a battery 27 through a suitable control rheostat 28. By actuation of the rheostat, the degree of energization of the winding 20 and therefore the magnitude of the circumferentially directed actuating force may be controlled as desired.

The armature ring 18 is supported for oscillation about the clutch axis and at the same time is adapted for some degree of floating axial movement. To this end, axially spaced pins 29 rigid with and projecting from the back of the armature ring project into recesses 30 in a disk 31 rotatably supported by the shaft 8. Compression springs 32 acting between the disk and the pins maintain the armature constantly in light mechanical contact with the face of the magnet while the latter is deenergized. As a result of such contact, the reluctance of the magnetic circuit through the rings is the same when the winding is deenergized as when energized; consequently, no excessive current is required in order to bring the rings into gripping engagement and the circumferentially directed frictional force due to the initial attraction of the rings will be exactly proportional to the current energizing the winding 20. Accurate control of the clutch is thereby obtained.

The friction face of the armature ring 18 is interrupted by a body of non-magnetic medium such as a segmental air gap 33 of sufficient circumferential length to discharge the residual magnetism in the magnet automatically as an incident to one revolution of relative rotation between the magnetic rings after the winding 20 has been deenergized. If desired, additional radial slots 33' may interrupt the armature face for the purpose of removing extraneous material from the coacting surfaces.

The magnetic parts are purposely made of relatively small diameter so that the forces resulting from energization of the winding 20 by current of a given strength will not be decreased appreciably by high speeds of rotation. Moreover, by virtue of the small diameter of the rings, the friction drag on the armature due to the constant mechanical contact is reduced to a minimum. Release of the main clutch is thereby facilitated as will appear later.

For a purpose to appear presently, the disk 31 is mounted on the shaft 8 for rotation relative thereto and is firmly held against axial movement away from the main clutch by an anti-friction bearing capable of sustaining the entire axial force applied to the main clutch plates while reducing to a minimum the resistance of the disk to turn while subjected to such thrust. To this end, a nut 34 threaded onto the shaft 8 within the magnet provides an abutment for a ring 35 which forms an inner raceway for a series of inclined anti-friction rollers 36 engaging a complemental raceway formed by a ring 37 secured to the disk 31. This anti-friction thrust bearing definitely limits the movement of the disk away from the main clutch. By releasing a set screw 34' and adjusting the nut 34, any looseness in the bearing may be taken up. Preferably this bearing is rendered self-aligning by forming the raceway of convex curvature and employing rollers with a peripheral groove of complemental concave contour.

The circumferentially directed actuating force which results from axial gripping engagement of the magnetic rings when the winding 20 is energized is augmented mechanically and applied in an axial direction to the main clutch through the medium of a novel motion-transmitting mechanism which possesses high efficiency, which acts with a powerful mechanical advantage, and which automatically compensates for a substantial amount of wear at the main clutch surface. This mechanism is interposed between the disks 7 and 31 and includes an elongated sloping cam extending circumferentially of the clutch axis and an anti-friction follower for the cam, the cam and follower being arranged to act through a substantial angle of relative angular motion between the disks.

While the cam may be carried by either of the disks 7 or 31, it is, in the present instance, made rigid with the disk 31 and comprises two circumferentially extending surfaces 38 and 39 facing axially toward the main clutch and sloping gradually throughout their circumferential length. The follower, which also may take various forms, herein comprises two rollers 40 supported by the disk 7 on diametrically opposite sides thereof to turn about substantially radial axes with their peripheries in rolling contact with the respective cam surfaces 38 and 39. Thus, it will be observed that the cams and the followers are adapted for movement circumferentially about the rotational axis of the clutch and that by relative angular movement between them, the disks 7 and 31 are moved relative to each other in an axial direction.

The slope of the cams 38 and 39 is such as to augment the actuating force to a high degree, the present leverage ratio being approximately 1 to 40. To obtain such a ratio and at the same time provide for taking up a substantial amount of wear in the main clutch, each of the cams is arranged to operate through a complete revolution of the disk 31 relative to the shaft 8. It will be observed that this is accomplished by employing two concentrically arranged cams and spacing the rollers 40 so that they follow the respective cams which, in the operation of the clutch, move through an angle determined by the existing clearances between the coacting surfaces of the main clutch. The high point of each cam terminates in an abutment 41 which engages the rollers 40 and limits the return movement of the disk 31 to a position in which the rollers contact the low points 42 of the cams.

To reduce friction at the points of contact between the rollers 40 and the cams 38 and 39, the peripheral surfaces of the rollers are inclined relative to their rotational axes so that there is no slippage between the roller and the cam surfaces even though the inner and outer peripheral edges of the rollers are spaced different distances from the rotational axis of the clutch. For this purpose, the rollers are made of frustoconical shape with their peripheral surfaces converging toward the clutch axis at such an angle that each point on the roller contacting the cam surface has substantially the same velocity about its own axis during the movement of the roller around the cam.

In the present instance, the rollers 40 are supported on the side of the disk 7 through the medium of pins 43 having their opposite ends supported by spaced lugs 44 and 45 projecting rigidly from the disk 7. Each pin has a reduced end portion snugly received in the lug 44, an intermediate section carrying the roller, and a section threading into a radial hole in the outer lug and locked therein as by a nut 46. To further contribute to the low friction losses in the motion-transmitting connection, the rollers 40 are carried on anti-friction bearings 47 on the intermediate portion of the pins 43. The mechanism above described for augmenting the rotary motion of the driven element of the pilot clutch and applying the same to the main clutch in an axial direction possesses an unusually high efficiency, the actual efficiency being approximately 87 percent in the present instance, without providing for lubrication of any of the bearing surfaces. It will be observed that this high efficiency is obtained by reducing the friction between all relatively moving surfaces, namely, between the disk 31 and its mounting through the use of the combined supporting and thrust rollers 36, at the cam surfaces by employing the rollers 40 having frusto-conical peripheries, and between the rollers and their mountings by employing the bearings 47.

By virtue of the fact that the efficiency of the motion-transmitting connection is substantially greater than 50 percent, it is possible to employ a simple spring 48 for automatically releasing the main clutch when the pilot clutch is deenergized, that is to say, a spring may be employed which is of sufficient strength to overcome friction losses in the motion-transmitting connection and turn the disk 31 back to clutch-released position relative to the disk 7 when the magnet is deenergized and yet the spring will not decrease appreciably the actuating torque produced by energization of the pilot clutch. In the present instance, the return spring must act substantially through a complete revolution and for this purpose is of the torsion type comprising a coil of a plurality of turns disposed between the disks 7 and 31 and having opposite ends secured respectively to these disks so as to exert a circumferentially directed force in opposition to the actuating force produced by energization of the magnet. In this way, the spring, in returning the parts to clutch-released positions, acts with the full mechanical advantage of the motion-transmitting connection. Therefore a relatively light spring will overcome, with the necessary margin of safety, the low frictional resistance of the cams and followers and the slight drag exerted on the armature due to the continuous contact between the pilot clutch rings.

The clutch constructed as above described will operate in either direction, that is, either of the shafts 8 and 11 may be the driver. The operation is as follows, assuming that the shaft 11 constitutes the driver and that the shaft 8 and the parts carried thereby are stationary, the return spring acting to maintain the cam abutments 41 against the rollers 40 with a force substantially greater than the friction force resulting from the light mechanical contact maintained between the magnet and armature by the springs 32. When current is applied to the coil 20, a circumferentially directed frictional force is produced on the armature 18 which is proportional to the energizing current and which overcomes the return spring 48 and turns the disk 31 in unison with the magnet until the cams have shifted the disk 7 sufficiently to take up the existing clearance between the main clutch plates. The latter are thus pressed together with a force corresponding to the magnet current whereupon a corresponding torque will be applied to the driven shaft. When the torque is capable of overcoming the load on the shaft 8, the latter will rotate with the shaft 8; otherwise slippage will occur between the plates of the main clutch and between the magnet and armature. Upon interruption of the magnet current, the friction torque exerted on the armature is decreased permitting the spring 48 to turn the disk 31 back to released position thereby relieving the pressure on the clutch plates whereupon the shafts become disconnected.

By maintaining continuous mechanical contact at the engaging surfaces of the pilot clutch and by virtue of the high efficiency of the motion-transmitting connection, it will be apparent that the power transmitted by the clutch will closely follow the current energizing the winding 20 with the result that extremely sensitive regulation may be obtained both in the application and in the release of the main clutch. As the main clutch plates wear away in service, the disk 31 will move through a greater angular distance in applying the main clutch. In this way, wear is taken up automatically and by virtue of the fact that each cam extends substantially through the circumference of the disk 31, a substantial amount of wear may occur without interfering with the proper operation of the clutch. For example, in one revolution of the disk 31 relative to the driven shaft, the rollers 40 are shifted axially from the position shown in full lines (Fig. 3) to that shown in dotted outline, a distance of about three-fourths of an inch.

Actual tests have shown that the clutch above described will transmit 250 static horse power before slippage between the plates 4 and 6 which are 11 inches in diameter and composed of ordinary asbestos filled friction material. Such power is developed by energization of the magnet with a maximum current of approximately one ampere which produces an 80 pound torque at the diameter of the outer cam 38. The clutch will be released with the required margin of safety by employing a return spring which exerts a twelve pound force on the disk 31 at the radius of the outer cam.

I claim as my invention:

1. A clutch of the class described comprising, in combination, a rotary casing open at one end and closed at the other, a rotary shaft projecting into said open end, a plurality of annular friction plates supported at their inner and outer edges by said shaft and the open end portion of said casing and adapted for axial gripping engagement with each other, a pilot friction clutch at the closed end of said casing comprising two axially engageable magnetic rings one of which is rotatable with said casing, a disk encircling said shaft between said plates and said pilot clutch and rotatable with the other pilot clutch ring, anti-friction devices rotatably supporting said disk from said shaft and arranged to sustain the endwise thrust exerted on the disk, a sloping axially facing cam surface extending circumferentially of said shaft throughout a substantial angle, an anti-friction follower engaging said surface and movable bodily around said shaft, said cam surface and said follower constituting a connection operable to convert the angular motion of said disk relative to said shaft into axial movement of the adjacent one of said plates, and spring means acting circumferentially of said shaft between the latter and said disk to restore the latter to clutch-released position relative to the shaft upon deenergization of said pilot clutch.

2. A clutch mechanism comprising, in combination, axially engageable driving and driven friction plates, a rotary shaft projecting axially through said plates and supporting one of the plates, a pilot friction clutch comprising two axially engageable magnetic rings adapted when energized to derive a circumferentially directed actuating force, an element arranged for rotation with one of said rings, anti-friction devices encircling said shaft between said pilot clutch and said plates and supporting said element to turn about said shaft, an axially facing and sloping cam surface spaced radially from said shaft and extending circumferentially of the latter through more than a half revolution, an anti-friction follower engaging said surface, said cam surface and said follower providing a connection operable to augment said actuating force and apply the same in an axial direction to said plates, and a torsion spring coiled about said shaft and acting between the shaft and said element to restore the element to clutch-released position relative to said shaft upon deenergization of said pilot clutch.

3. A clutch mechanism comprising, in combination, a main clutch having rotary driving and driven friction members mounted for relative axial movement into gripping engagement, a magnetic pilot clutch having axially engageable friction rings normally rotatable with said driving and driven members respectively, and means for augmenting the circumferentially directed force derived by said pilot clutch and applying the same to said main clutch comprising an element rotatable with one of said members and adapted for axial movement relative thereto, a second element held against axial movement but adapted for angular movement relative to said first element, one of said elements being rotatable with one of said rings, two elongated concentric cam surfaces facing axially and extending circumferentially of said elements, and angularly spaced anti-friction followers engaging the respective cam surfaces, said surfaces sloping gradually in an axial direction whereby to move said elements progressively and axially relative to each other in a direction to engage said main clutch members.

4. A clutch mechanism comprising, in combination, a main clutch having rotary driving and driven friction members mounted for relative axial movement into gripping engagement, a magnetic pilot clutch having axially engageable friction rings normally rotatable with said driving and driven members respectively, and means for augmenting the circumferentially directed force derived by said pilot clutch and applying the same to said main clutch comprising an element rotatable with one of said members and adapted for axial movement relative thereto, a second element held against axial movement but adapted for angular movement relative to said first element, one of said elements being rotatable with one of said rings, axially inclined and circumferentially extending cam means and follower means therefor respectively associated with said elements and acting substantially through a complete revolution of relative angular movement between the elements to move the elements axially relative to each other in a direction to engage said main clutch members.

5. A clutch mechanism comprising, in combination, a multiple plate friction clutch including a terminal plate movable axially to produce gripping engagement of all of the plates, a pilot magnetic clutch having axially engageable friction elements and adapted when energized to derive a circumferentially directed actuating force, a plate receiving said actuating force and mounted for angular movement but held against axial movement relative to said first mentioned plate, an elongated axially facing cam surface of a diameter equal to that of said first mentioned plate rigidly mounted on and extending circumferentially of one of said plates, said surface sloping in an axial direction, an anti-friction member mounted on the other plate to turn about a substantially radial axis with its periphery in rolling contact with said surface, and spring means on said second mentioned plate acting in a circumferential direction when said pilot clutch is deenergized to turn such plate back to clutch-released position relative to said first mentioned plate.

6. A clutch mechanism comprising, in combination, a main clutch having rotary driving and driven friction plates adapted for axial gripping engagement, a pilot clutch spaced axially a substantial distance from said main clutch and having two rotary magnetic friction rings arranged for axial gripping engagement whereby to derive a circumferentially directed actuating force upon energization of the rings, a connection disposed in the axial space between said main and pilot clutches and operable to augment said actuating force and apply the same in an axial direction to said main clutch, said connection including an element mounted to turn with one of said rings and relative to said main clutch plates about the axis thereof, and spring means acting on said element upon deenergization of said pilot clutch to turn the same back to clutch-released position.

7. A clutch mechanism comprising, in combination, axially engageable rotary friction members constituting a main clutch, a magnetic pilot clutch having axially engageable friction rings rotatable about the axis of said main clutch and adapted when energized to derive a circumferentially directed actuating force, an element movable angularly about said axis and having a rotary driving connection with one of said rings, anti-friction devices rotatably supporting said element and arranged to sustain the axial thrust exerted thereon, an elongated sloping cam surface facing axially and extending circumferentially around said axis through a substantial angle, a follower device including a roller with its periphery contacting said surface, anti-friction devices rotatably supporting said roller to turn about a substantially radial axis, said cam surface and its follower acting to augment said actuating force and apply the same in an axial direction to said main clutch, and spring means normally applying a circumferentially directed force to said element in opposition to said actuating force and capable of returning the motion-transmitting parts to clutch-released position upon deenergization of said pilot clutch.

8. A clutch mechanism comprising, in combination, a main clutch having rotary driving and driven friction members mounted side by side, an element mounted adjacent said members for axial movement to press the members into gripping engagement, a second element, anti-friction devices supporting said second element for angular movement relative to said first element and holding the second element against axial movement in one direction axially of the first element, a magnetic pilot clutch comprising two rings adapted when energized to be brought into axial gripping engagement whereby to derive a circumferentially directed actuating force, one of said rings having a rotary driving connection with said second element, an elongated axially facing sloping cam surface extending circumferentially of one of said elements throughout a substantial angle, an anti-friction follower on the other element engaging said surface whereby said actuating force is augmented and applied to said first element in a direction to engage said main clutch, and spring means acting in a circumferential direction on said second element to restore said follower to the low point on said cam surface upon deenergization of said pilot clutch.

9. A clutch mechanism comprising, in combination, rotary driving and driven friction members coaxially arranged for gripping engagement, a magnetic pilot clutch comprising a magnet ring providing two annular poles and an armature ring adapted for frictional gripping engagement with said magnet ring upon energization of the latter, means rotatably supporting one of said rings for floating axial movement, spring means normally acting to maintain the friction faces of said rings continuously in light mechanical contact whereby to maintain the reluctance of the magnetic circuit through the rings uniform while the pilot clutch is deenergized, an axially facing and sloping cam surface extending circumferentially of the clutch axis through a substantial angle, a follower therefor, said cam surface and follower constituting a motion-transmitting connection operable to augment the circumferentially directed force derived by energization of said clutch and to apply the same in an axial direction to said members, and return spring means acting on one of said rings to restore said cam and follower to clutch-released position upon denergization of said magnet ring, said motion-transmitting connection including anti-friction supporting and thrust sustaining means providing for transmission of said actuating force to said members with an efficiency substantially greater than fifty percent whereby to permit said return spring means to restore the parts to clutch-released position against the constant friction between said rings produced by said first mentioned spring means.

10. A clutch mechanism comprising, in combination, rotary driving and driven friction members coaxially arranged for gripping engagement, a magnetic pilot clutch comprising a magnet ring providing two annular poles and an armature ring adapted for frictional gripping engagement with said magnet ring upon energization of the latter, means rotatably supporting one of said rings for floating axial movement, spring means normally acting to maintain the friction faces of said rings continuously in light mechanical contact whereby to maintain the reluctance of the magnetic circuit through the rings uniform, a motion-transmitting connection including a circumferentially extending cam surface and a follower therefor operable to augment the circumferentially directed actuating force derived by energization of said magnet and apply the same in an axial direction to said members, return spring means operable upon deenergization of said magnet to restore the parts of said connection to clutch-released position against the friction of said continuous contact, and anti-friction means increasing the efficiency of said connection to a value such as to permit said return spring means to overcome the frictional drag produced by said first mentioned spring means.

11. A clutch mechanism comprising, in combination, rotary driving and driven members having opposed axially facing friction surfaces arranged for gripping engagement, a rotary magnetic friction clutch adapted when energized to derive a circumferentially directed actuating force, a motion-transmitting connection arranged to augment said force and apply the same in an axial direction to said members including an elongated circumferentially extending cam and a follower therefor mounted for relative angular movement about the rotational axis of said members and acting in such movement with a leverage sufficiently great to prevent restoration of the parts to clutch-released position by the reaction of said members upon deenergization of said magnetic clutch, and spring means exerting a circumferentially directed force tending to restore the parts of said connection to released position upon deenergization of said magnetic clutch, said connection having an efficiency sufficiently great to permit said spring means to operate effectually.

12. A clutch mechanism comprising, in combination, rotary driving and driven friction members arranged for axial gripping engagement, a rotary magnet friction clutch adapted when energized to derive a circumferentially directed actuating force, a motion-transmitting connection arranged to augment said force and apply the same in an axial direction to said members including an elongated cam follower and a cam surface extending circumferentially of the clutch axis throughout a substantial angle and acting with a leverage sufficiently great to prevent restoration of the parts to clutch-released position by the reaction of said members upon deenergization of said magnetic clutch, spring means exerting a circumferentially directed force tending to restore the parts of said connection to released position upon deenergization of said magnetic clutch, and anti-friction means associated with said connection and operable to increase the efficiency thereof to a value such as to permit said spring means to act effectually in restoration of said parts.

13. A clutch mechanism comprising, in combination, a main clutch having rotary driving and driven members with opposed axially facing friction surfaces arranged for gripping engagement by axial movement of one of the members, a magnetic pilot clutch having axially engageable friction rings adapted when energized to derive a circumferentially directed actuating force, motion-transmitting mechanism for augmenting said force and applying the same in an axial direction to said axially movable member including an elongated cam surface extending circumferentially of the clutch axis throughout a substantial angle and a follower for said cam, said cam surface and said follower being mounted for relative angular movement about the clutch axis, spring means opposing said actuating force and acting on one of said pilot clutch rings, said motion-transmitting mechanism having an efficiency substantially greater than fifty-percent whereby to permit said spring means to restore said ring and said mechanism to clutch-released position upon deenergization of said pilot clutch.

14. A clutch mechanism comprising, in combination, a main clutch having opposed axially facing friction members including a plate movable axially to produce gripping engagement of the members, a pilot magnetic clutch having axially engageable friction elements and adapted when energized to derive a circumferentially directed actuating force, a plate receiving said actuating force and mounted for angular movement but held against axial movement relative to said first mentioned plate, an elongated axially sloping cam surface rigid with and extending circumferentially of one of said plates, an anti-friction member mounted on the other plate to turn relative thereto about a substantially radial axis with its periphery in rolling contact with said cam surface, and spring means acting on said second plate in a circumferential direction to restore said member to the low point on said cam surface upon deenergization of said pilot clutch.

15. A clutch mechanism comprising, in combination, a disk clutch having rotary driving and driven members arranged for axial gripping engagement by axial movement of one of the terminal members, a magnetic pilot clutch having axially engageable friction rings adapted when energized to derive a circumferentially directed actuating force, a motion-transmitting connection for augmenting said force and applying the same in an axial direction to said first mentioned clutch including an elongated cam surface extending circumferentially of the clutch axis and a follower therefor, spring means exerting a circumferentially directed force on one of said rings in opposition to said actuating force and capable of restoring the actuated ring and the parts of said motion-transmitting mechanism to clutch-released relation upon deenergization of said pilot clutch, said motion-transmitting connection having an efficiency of at least sixty-five percent whereby to permit said spring to release said first mentioned clutch.

16. A clutch mechanism comprising, in combination, a main clutch comprising rotary driving and driven members having axially facing friction surfaces and mounted for relative axial movement to cause gripping engagement of said surfaces, a magnetic pilot friction clutch adapted when energized to derive actuating force directed circumferentially of the rotational axis of said members, and a motion-transmitting connection between said clutches for augmenting said actuating force and applying the same in an axial direction to said main clutch, said connection including two cam surfaces extending circumferentially of said axis for more than a half-revolution so as to overlap each other and separate followers engaging the respective surfaces at annularly spaced points thereon.

17. A clutch mechanism comprising, in combination, a main multiple disk clutch having rotary driving and driven disks with one terminal disk held against axial movement and the other terminal disk mounted for axial movement toward and away from the first terminal disk to cause gripping engagement of the clutch disks, a magnetic pilot friction clutch adapted when energized to derive an actuating force directed circumferentially of the rotational axis of said main clutch, and a motion transmitting connection between said pilot clutch and said axially movable terminal disk for augmenting said actuating force and applying the same in an axial direction to said second terminal disk, said connection including a thrust sustaining member and an anti-friction bearing mounting said member for universal rocking movement about the axis of said main clutch whereby to permit rocking of the member during actuation of said main clutch and thereby compensate for inequalities in the thickness of said driving and driven disks.

18. A clutch mechanism comprising, in combination, a main multiple disk clutch having rotary driving and driven disk elements with one terminal element mounted for axial movement to cause gripping engagement of the clutch disks, a magnetic pilot friction clutch adapted when energized to derive an actuating force directed circumferentially of the rotational axis of said main clutch, and a motion-transmitting connection between said pilot clutch and said terminal disk element for augmenting the actuating force and applying the same in an axial direction to the latter element, said connection including a thrust sustaining member and an anti-friction bearing rotatably supporting said member for automatic self-alignment with respect to said terminal element.

ARTHUR P. WARNER.